UNITED STATES PATENT OFFICE.

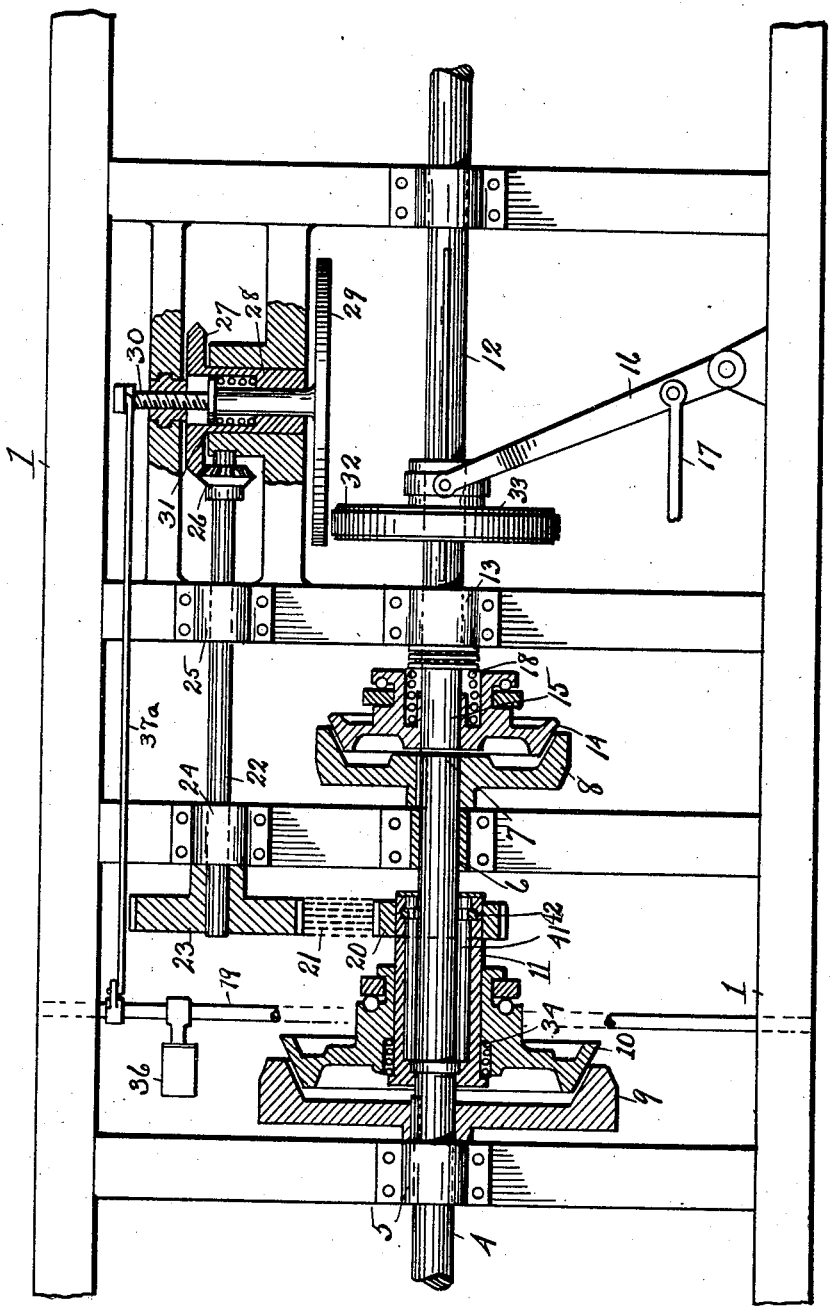

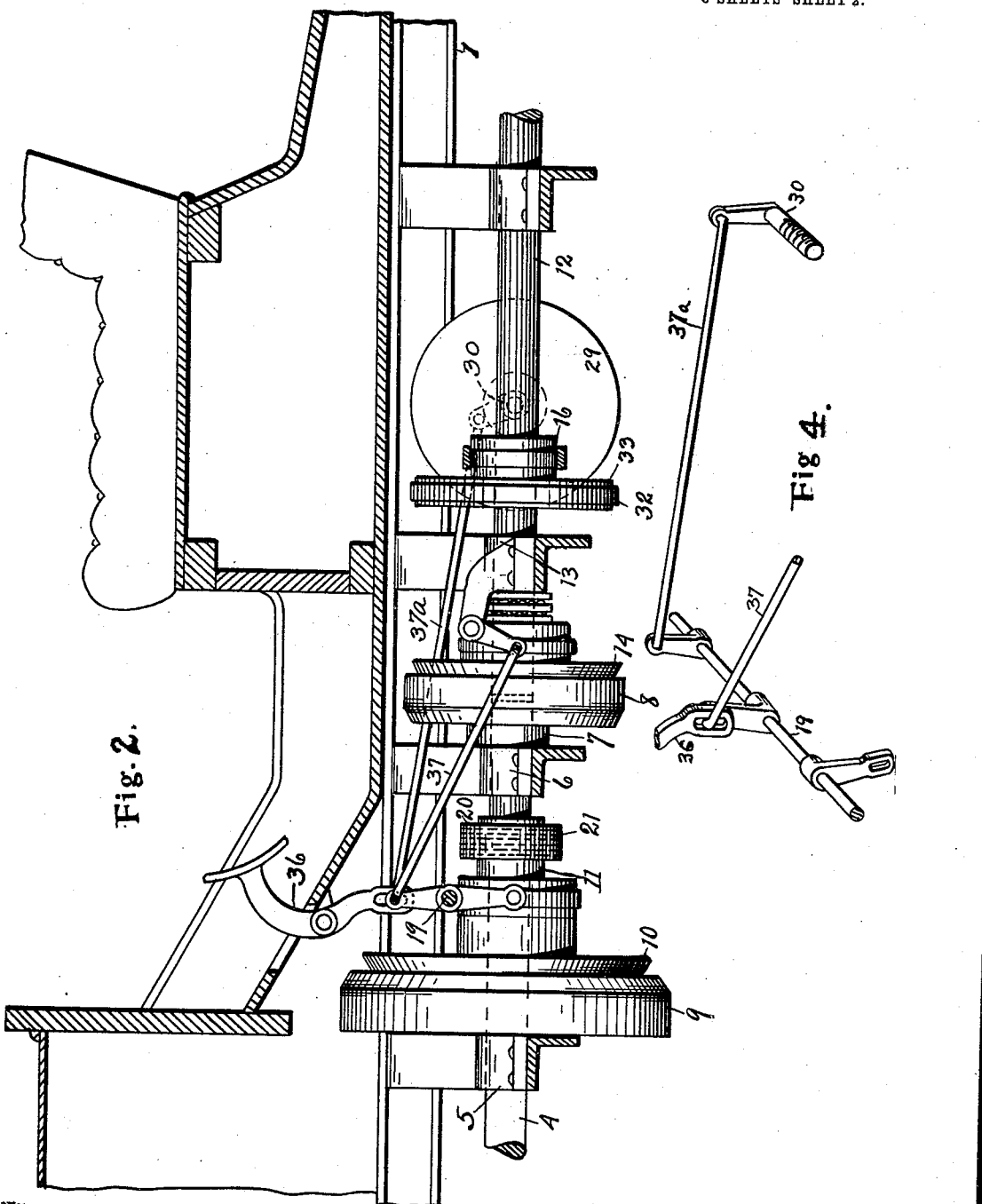

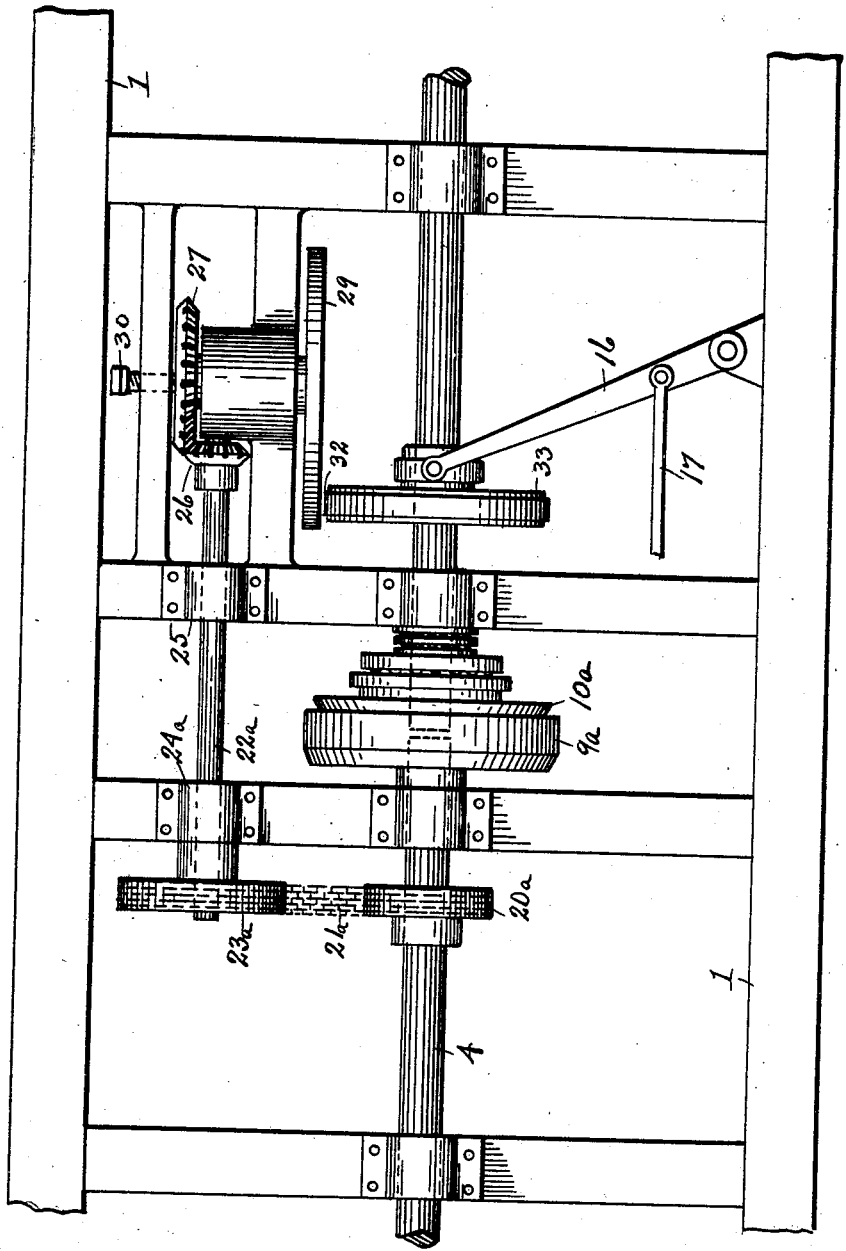

RICHARD S. GEHLERT AND JOHN G. COLERIDGE, OF DETROIT, MICHIGAN.

TRANSMISSION-GEARING.

999,984. Specification of Letters Patent. Patented Aug. 8, 1911.

Application filed August 5, 1910. Serial No. 575,629.

*To all whom it may concern:*

Be it known that we, RICHARD S. GEHLERT, a citizen of the United States, and JOHN G. COLERIDGE, a subject of the King of Great Britain, residing at Detroit, county of Wayne, State of Michigan, have invented a certain new and useful Improvement in Transmission-Gearing, and declare the following to be a full, clear, and exact description of the same, such as will enable others skilled in the art to which it pertains to make and use the same, reference being had to the accompanying drawings, which form a part of this specification.

This invention relates to transmission gearing for automobiles, and has for its object an improved organization of parts, adapted especially for use on motor vehicles, which makes it possible to use either friction transmission mechanism or clutch transmission mechanism, with a quick change from one to the other easily available.

In the drawings:—Figure 1 is a plan view partly in section of the transmission gearing, the immediately adjacent portions of the chassis being also shown. Fig. 2 is a side elevation, partly in section, showing the transmission mechanism in place with respect to the chassis, and of the control levers. Fig. 3 is a plan view of a slightly modified form of mechanism, in which one pair of the clutch members is omitted. Fig. 4 is a view of the foot lever and rock shaft disassociated from the other parts.

1 indicates the chassis of the vehicle, which is supported in whatever manner is preferred upon its traction wheels. The engine is mounted thereon near one end, and from it extends rearwardly the power shaft 4. The rear portion of the shaft is journaled in bearings 5 and 6, with the extreme end 7 projecting beyond the bearing 6 sufficiently for the attachment thereto of the receiving or concaved clutch member 8. Adjacent the bearing 5 the fly wheel 9 is fixed to the shaft 4. Its rearward face is concaved to form a clutch face for the engagement therein of the entering clutch member 10, which is carried on sleeve 11, which is not keyed to the shaft 4, but is rotatable with respect thereto. The sleeve is preferably, though not necessarily spaced from the shaft 4 by roller bearings 41, which make provision also, by means of collar 42, against the drag against their free rotation due to end thrust, as hereinafter explained.

On the forward end 15 of the driven or rear axle shaft 12, which passes through journal bearing 13, is keyed the entering clutch member 14, which is designed to coöperate with the concaved member 8 in furnishing a direct drive, being moved into and out of engagement by means of the control lever 36, and the link 37. It is normally held in projected engaging position by the spring 18, which engages about the shaft and abuts against the end of the adjacent journal bearing 13, and the direct drive is secured by releasing the foot pressing upon the lever 36, thus allowing the spring 18 to act.

The rock shaft 19 is preferably journaled at its ends in the sides of the chassis, extending crosswise thereof, and the rock arms which are keyed thereto and to which are attached the forward ends of the links 37 (one on each side of the shaft) are swung thereabout and with it by means of the control lever 36, against the pull of the spring 18, when it is desired to throw the clutch, members 8 and 14, out of engagement. By the same movement of the rock shaft 19 the actuation of the link 37$^a$ is accomplished to effect, through the medium of the worm 30, the movement of the friction disk 29 against the friction wheel 33.

On the rear end of the sleeve 11 is a gear wheel 20, over which passes an endless chain 21, communicating the motion of the shaft 4 to the shaft 22 through the medium of its gear wheel 23, over which it also passes. The shaft 22 is journaled in bearings 24 and 25, and carries on its rear end a bevel gear 26, which meshes with the bevel gear 27 on the end of the hollow stem 28 of the friction disk 29, which is adapted to be moved by the worm 30, against the pressure of the spring 31, against the periphery 32 of the friction wheel 33. The clutch member 10, being slidable along the sleeve 11 as it is moved into and out of engagement with the friction face of the fly wheel 9, does not interfere, by its movement, with the continuous alinement of the chain-carrying wheel 20 with the gear wheel 23 on the shaft 22.

The operation of this device is as follows:—When it is desired to start the car, the entering clutch member 10 is, by the movement of the actuating foot lever 36 and rock shaft 19, forced into frictional contact with the bearing surface of the fly wheel 9, against the pressure of the spring 34. This movement of the foot lever and rock shaft is at the same time communicated, through the medium of the link 37ª, to the worm 30, forcing the friction disk into engagement with the periphery 32 of the wheel 33, so that immediately upon the shaft 22 and its related parts receiving actuation due to the contact of the clutch parts 9 and 10, the friction wheel, which is keyed to the rear or driven shaft 12, is ready to transmit the motion thereto. When it is desired to change to the direct drive, the clutch members 8 and 14, which are in axial alinement though on separate shafts, are, by the release of foot pressure upon the lever 36, allowed to move into frictional contact under the push of the spring 18. The release of the foot-lever 36 of course ends the transmission of movement to the friction drive parts, since the spring 34, which has been held under compression, acts to force the entering clutch member away from the adjacent concaved face of the fly wheel 9.

In the modified form illustrated in Fig. 3, which is especially adapted for truck and other relatively heavy work, the friction gearing parts including the chain 21ª and shaft 22ª are rotating at all times that the power shaft is rotating, the gear wheel 20ª being keyed to the shaft, rather than to a loose sleeve; and it will be noted that in this type the wheel 20ª is located forward of the fly wheel 9ª rather than to the rear of it. The parts 10ª and 9ª of the clutch member are brought into frictional relation similarly to the corresponding parts in the other type of device. It is intended that the friction drive be used principally for starting the vehicle, or for use on a very heavy sandy road; after a good start has been secured the friction mechanism may, if desired, be thrown out of further operative connection, and the direct drive mechanism be thrown into working relation with the power shaft parts.

What we claim is:—

1. A transmission gearing, having in combination a power shaft, a fly wheel keyed thereto, a sleeve engaging thereabout, a clutch member adapted to frictionally engage said fly wheel, carried by said sleeve, means for yieldingly holding said clutch and said fly wheel out of engagement, a second shaft parallel to said power shaft, gear wheels fixed to said power shaft and to said second shaft in alinement with one another, an endless transmission chain carried by said gear wheels, whereby the rotation of the power shaft may be communicated to said second shaft, a gear wheel carried on one end of said second shaft, a rotatable friction disk provided with a central stem extending transversely of said second shaft, a gear wheel at the outer end of said stem and meshing with said first named gear wheel, a driven shaft in substantial axial alinement with said power shaft, a friction wheel slidably mounted thereon, means for moving said friction wheel therealong, a pair of clutch members carried on the adjacent ends of the power shaft and the driven shaft, and means for throwing said members into engagement, substantially as described.

2. In a transmission gearing, in combination with a power shaft, a driven shaft in substantial alinement therewith, clutch members fixed to one of said shafts, a complementary clutch member slidably mounted on the other of said shafts, spring means for keeping the parts of one set of clutch members normally out of engagement with one another, and for keeping the parts of the other set of clutch members normally in engagement with one another, a friction wheel carried on said driven shaft, a friction disk having a stem portion adapted to be brought into frictional contact with the periphery of said friction wheel, a second shaft parallel to said power shaft, intermeshing gear wheels carried on said second shaft and on the stem portion of the friction disk, whereby the same may be actuated by the rotation of said second shaft, power-transmitting means connecting the power shaft with said second shaft, and means for throwing the parts of either of the clutch members into engagement against the resistance of their springs, substantially as described.

3. In a transmission gearing, the combination of a power shaft, a driven shaft in substantial alinement therewith, a second shaft substantially parallel therewith, means connecting the power shaft and the second shaft, whereby the rotative movement of the power shaft is communicated to the second shaft, a friction disk having an axial stem portion, rotatably mounted with said stem portion lying transversely of said second shaft, intermeshing gear wheels mounted upon the stem portion of the friction disk and upon the adjacent end of the second shaft, whereby the movement of said second shaft is communicated to said friction disk, a friction wheel fixed upon the driven shaft with its periphery adjacent the friction surface of the friction disk, means for forcing said friction disk against the periphery of the friction wheel, a fly wheel having a clutch surface carried by said power shaft adjacent said means connecting the power shaft with the second shaft, an entering clutch member slidably carried on the driven shaft, a receiving member carried on that end of the power shaft adjacent thereto, and means for forcing either set of clutch members into engagement, substantially as described.

In testimony whereof, we sign this specification in the presence of two witnesses.

RICHARD S. GEHLERT.
JOHN G. COLERIDGE.

Witnesses:
VIRGINIA C. SPRATT,
WILLIAM M. SWAN.

Copies of this patent may be obtained for five cents each, by addressing the "Commissioner of Patents, Washington, D. C."